United States Patent [19]
Khaleghi

[11] Patent Number: 6,008,916
[45] Date of Patent: *Dec. 28, 1999

[54] DISTORTION PENALTY MEASUREMENT TECHNIQUE IN OPTICAL SYSTEMS BASED ON SIGNAL LEVEL ADJUSTMENT

[75] Inventor: Farideh Khaleghi, Ontario, Canada

[73] Assignee: Nortel Networks Corporation, Montreal, Canada

[*] Notice: This patent is subject to a terminal disclaimer.

[21] Appl. No.: 08/934,060

[22] Filed: Sep. 19, 1997

[51] Int. Cl.[6] .......................... H04B 10/08; H04B 10/00; H04B 10/06
[52] U.S. Cl. .................... 359/110; 359/110; 359/161; 359/189
[58] Field of Search .................... 359/110, 161, 359/189

[56] References Cited

U.S. PATENT DOCUMENTS

| | | | |
|---|---|---|---|
| 4,799,790 | 1/1989 | Tsukamoto et al. | 356/73.1 |
| 4,823,360 | 4/1989 | Tremblay et al. | 375/4 |
| 5,585,954 | 12/1996 | Taga et al. | 359/158 |

*Primary Examiner*—Jason Chan
*Assistant Examiner*—Mohammad Sedighian
*Attorney, Agent, or Firm*—Aprilia U. Diaconescu

[57] ABSTRACT

The BER is used as a parameter for evaluating the performance of an optical transmission system. Performance of optical systems is also defined by the Q factor, which indicates the signal-to-noise ratio of the electric signal regenerated by the receiver. In the absence of distortion, Q is univocally determined by the BER. Q is calculated using an estimated BER measured with the path under normal conditions of operation, and a distortion-free Q is determined in the same operating point of the system. The distortion penalty for the path is obtained by comparing the measured Q with the distortion free Q. In addition, the distortion penalty for a transmitter-receiver pair, and a distortion penalty for a transmission link between the transmitter and receiver may be determined.

22 Claims, 5 Drawing Sheets

DISTORTION PENALTY MEASUREMENT TECHNIQUE IN OPTICAL SYSTEMS BASED ON SIGNAL LEVEL ADJUSTMENT

BACKGROUND OF THE INVENTION

1. Field of the Invention

This invention is directed to a performance evaluation analysis in optical systems, and more particularly to a distortion measurement procedure based on signal level adjustment.

2. Background of the Invention

Optical signals suffer degradation between the transmitter and receiver from such factors as noise, inter-symbol interference, fiber dispersion, non-linearity of the elements and transmission medium, etc. In addition, in amplified wavelength division multiplexed (WDM) systems, the transmission characteristics vary from one channel to another due to the non-flat gain and noise profile of erbium-doped fiber amplifiers (EDFAs).

Distortion is defined as any inaccurate replication of a signal transmitted over a communication link, and could be referred to any network element (NE) along the link. It can be measured by assessing the difference between the wave shape of the original signal and that of the signal at the network element of interest, after it has traversed the transmission link.

In the last decade, transmission rates of data signals have increased progressively, which demands faster and more sensitive transmission systems. For transmission at high rates, such as 40 or 80 Gb/s, the distortion of the optical link is a critical parameter. With various types of dispersion shifted fiber, dispersion compensating fiber and dispersion compensating filters that make up a given link, determining distortion is no longer a simple operation, especially in optical transmission systems with in-line optical amplifiers. System performance degradation caused by noise and optical path distortions are usually difficult to separate, making the performance evaluation complicated.

In the evaluation of the characteristics of an optical fiber communication system, the bit error rate (BER) has usually been used as a parameter for performance evaluation. BER is defined as the ratio between the number of the erroneously received bits to the total number of bits received over a period of time (a second). A number of codes have been provided in the signal at transmitter for error detection, the basic idea being to add redundant bits to the input data stream over a known number of bits. The BER calculated by the receiver includes information on all impairments suffered by the signal between the transmitter and receiver, i.e. both noise and distortion information.

Performance of an optical system is also defined by a parameter called Q. The Q value indicates the signal-to-noise ratio of the electric signal regenerated by the optical receiver, and is defined as follows:

$$Q = \frac{\mu_m - \mu_s}{\sigma_m + \sigma_s} \quad (1)$$

where $\mu_m$ is the mean value of the '1's, $\mu_s$ is the mean value of the '0's, $\sigma_m$ is the standard deviation of the level of '1's, and $\sigma_s$ is the standard deviation of the level of '0's. In the absence of distortion, Q entirely represents the bit error rate (BER) performance of the system, and this property is used in the present invention.

Optical systems have very low BERs under nominal condition of operation, and therefore measurement of BER is time consuming. In a system having a transmission rate of 5 GB/s for instance, a minimum of six hours is needed to measure a BER of $10^{-14}$ or below. It is also evident that the BER may vary significantly during this long period of time. Thus, if the BER decreases to $10^{-10}$ for a short period even, the mean value of the BER over the above six hours will never reach $10^{-14}$, making the measurement unreliable.

U.S. Pat. No. 5,585,954 (Taga et al., issued Dec. 17, 1996 and assigned to Kokusai Denshin Kabushiki Kaisha) discloses a method for measuring the Q factor as a performance evaluation parameter for a transmission system. However, the patent is concerned with reducing the time necessary for measuring Q and obtaining real-time Q values, rather than to separating the noise and distortion contributions to the errors along a transmission path.

Signal-to-noise ratio (SNR) is a parameter that represents noise only characteristics of a system. In non-optical systems, where envelope-detection (square-law detection) is not necessary, the noise is generally independent of the signal level, and as such, in the absence of distortion, SNR is the only determining parameter for BER performance of the system. In these systems, an AGC (automatic gain controller) may be used to compensate for variations in the received power.

On the other hand, in optical systems, because of the square-law detection effected at the receiver, there are some signal-dependent noise components, so that the optical SNR (OSNR) depends on the signal level. As such, the BER of optical systems depends not only on the OSNR, but also on the signal, i.e. on the level of the received power. Even when an equivalent optical AGC is used, the BER performance of the system is not completely independent of the received optical power. The present invention accounts for this dependency by effecting all measurements of BER and OSNR for the same power of the signal.

There are several test instruments available for measuring the extent of signal degradation using an eye closure diagram. An eye closure diagram is the graphic pattern produced on an oscilloscope when a baseband signal is applied to the vertical input of the oscilloscope and the symbol rate triggers the instrument time base. For a binary signal, such an eye diagram has a single eye which is open or closed to an extent determined by the signal degradation. An open pattern is desired. Changes in the eye size indicate inter-symbol interference, amplitude irregularities, or timing problems, such as jitters, depending on the signal that is measured.

For example, U.S. Pat. No. 4,823,360 (Tremblay et al., issued Apr. 18, 1989 and assigned to Northern Telecom Limited) discloses a device for measuring chromatic dispersion of an optical fiber based on a baseband phase comparison method. The device described in this U.S. patent evaluates the transmission link performance using three threshold levels for recovering data. Two of the thresholds are obtained by measuring the level of "long 0s" and "long 1s", respectively, for a preset error rate, and the third threshold is provided in a selected relationship to the other two.

U.S. Pat. No. 4,799,790 (Tsukamoto et al., issued Jan. 24, 1989 and assigned to Anritsu Corporation) discloses a device comprising a transmitter for launching signals of various wavelengths into a reference or test fiber, and a receiver. At the receiver, the difference between two adjacent wavelengths is measured for both the reference and test paths for determining the delay of the respective wavelength.

None of these U.S. patents is concerned with providing a distortion measurement procedure that is simple to implement and gives a reliable measure of the contribution of the distortion to the system performance.

SUMMARY OF THE INVENTION

An object of the present invention is to provide a simple and reliable method for measuring the distortion penalty for a transmission path.

Another object of the invention is to provide a distortion penalty measurement technique which separates the contribution of distortion from the contribution of noise in the BER. This is accomplished by estimating the Q corresponding to the BER value measured in a certain operating point, and comparing it to a distortion-free Q estimated in the same operating point. The distortion-free Q may also be computed in the same operating point, using a model adopted for the receiver.

As such, the invention provides a technique that respects the dependence of distortion penalty on the operating point of the respective channel, by conducting the measurements under actual operating condition of the system. $D_{TR}$ with a provisioned $D_{TR}$.

Accordingly, a method for measuring the distortion penalty imposed on an information signal travelling on a transmission path including a transmitter, a receiver, and a transmission link connecting the transmitter and the receiver, comprises the steps of, determining an operating point (OP) for the transmission path, measuring a first parameter including information on errors in the information signal cumulated along the path, measuring a second parameter including information on errors in the information signal due to the noise cumulated along the path, and calculating a path distortion penalty ($D_P$) value by comparing the first parameter with the second parameter.

An advantage of this method is that it provides a simple transmitter-receiver distortion penalty measurement technique that could be used in the factory.

Another advantage of the invention is that the transmitter-receiver distortion penalty is determined in the actual operating point of the system. The results are therefore more comprehensive because the operating point of the electronics of the receiver changes with the optical operating point.

Still another advantage according the techniques of the invention is that distortion penalty is measured in the presence of the ASE (amplified spontaneous emission) noise. For example, under the real operating conditions, where OSNR is low, the power of the noise contributed by e.g. XPM (cross phase modulation) is negligible compared to the power of noise introduced by ASE. Because the ASE noise is predominant in the OSNR, the value of distortion penalty determined using the techniques of the invention is not over-estimated.

BRIEF DESCRIPTION OF THE DRAWINGS

The foregoing and other objects, features and advantages of the invention will be apparent from the following more particular description of the preferred embodiments, as illustrated in the appended drawings, where.

DESCRIPTION OF THE PREFERRED EMBODIMENT

Figure 1A:
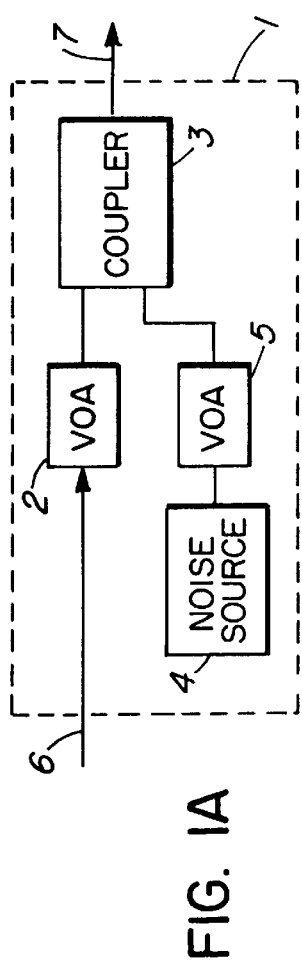
FIG. 1A is a block diagram of the distortion measurement unit according to the invention.

Definition of some of the terms used throughout this specification is given next for a better understanding of the invention.

In general, all non-linear effects, such as self-phase modulation (SPM), four-wave mixing (FWM), cross phase modulation (XPM) and modulation instability (MI), as well as amplified spontaneous emission (ASE) noise and dispersion contribute together to lowering the performance of an optical system and affect the value of BER. The distortion penalty measurement technique according to this invention is based on the fact that many distortion components, such as XPM, MI, SFM, manifest themselves as optical phase noise and do not affect the value of OSNR.

While by definition distortion measures changes in the shape of a signal, rather than changes in the power level, experiments conducted in the laboratory over different links and with different transmitter-receiver pairs, indicate that the distortion penalty depends upon the level of OSNR. On the other hand, it is known that the BER of optical systems depends not only on the OSNR, but also on the signal, i.e. on the level of the received power. As such, distortion penalty in an optical communications system is a function of the operating point of the respective channel. To account for this finding, all measurements were performed in the same operating point of the transmission channel.

The operating point (OP) of a channel is defined herein by the value of the signal power ($P_O$) and the OSNR value ($OSNR_O$) measured at the input of the receiver. The operating point of a channel is designated herein by $O_P$.

'Signal level adjustment' (SLA) measurement technique comprises adjusting the power of the signal at the input of a receiver $R_i$ for positioning the operating point of a channel $\lambda_i$ at the desired $P_O$ value for a given $OSNR_O$. This method allows performing all measurements in the same $OP_i$ for a given channel $\lambda_i$.

Measurement of the BER parameter for a transmission channel is performed, according to the invention, using a graphic estimation on BER-voltage (BERV) or waterfall diagrams. The term 'estimated' is used in the following for the values obtained using the BERV/waterfall diagrams.

In a BERV diagram, the BER is plotted against different values of the reference voltage ($V_{Ref}$), or threshold voltage level, for which the BER is measured during a reasonable period of time. $V_{Ref}$ is the voltage level used by the receiver to decode the input signal as a logic '1' when the signal is greater than $V_{Ref}$, and to decode the input signal as a logic '0' when the signal is less than $V_{Ref}$. Since the distribution of the noise is Gaussian, a linear extrapolation of the flanks of the BERV diagram gives a good estimate for the BER. The period of time used for the measurements disclosed in this specification was 5 to 10 minutes.

Waterfall diagrams, which are plots of the BER against the receiver power for a fixed OSNR value, can also be used to estimate the BER. However, waterfall diagrams are measured for low values of receiver power, which might not represent the actual operating point of a system and do not contain any information about probable existence of a BER floor.

Generally, if the BER performance of a channel at the output of a system is known, the value of Q can be estimated by formula:

$$Q^2 = 4.452 \log\left(\frac{0.1235}{BER}\right) \quad (2)$$

Formula (2) is used throughout the present specification for calculating the value of Q for a BER measured at the output of the receiver $R_i$ for the operating point ($OP_i$) of the respective channel $\lambda_i$. A distortion free Q ($Q_{DF}$) is also calculated using a BER measured for the same operating point, using "long 1's" and "long 0's".

Modified BERV diagrams used in this invention are plots of Q against the reference voltage, the Q values being calculated for the corresponding values of the BER, using formula (2).

FIG. 1A illustrates a distortion measurement unit (DMU) 1 according to the invention. Unit 1 comprises a coupler 3, which couples the output of a first variable optical attenuator (VOA) 2 to output 7. VOA 2 is used to vary or adjust the power level of the signal on input 6 to a desired value on output 7. DMU 1 also comprises a noise source 4 and a second VOA 5 used for controlling the power of the noise generated by source 4. VOA 5 is also connected to the input of coupler 3, and noise of a desired power is obtained at output 7. Noise source 4 could be an optical amplifier which, in the absence of an input signal, outputs ASE noise only.

Figure 1B:
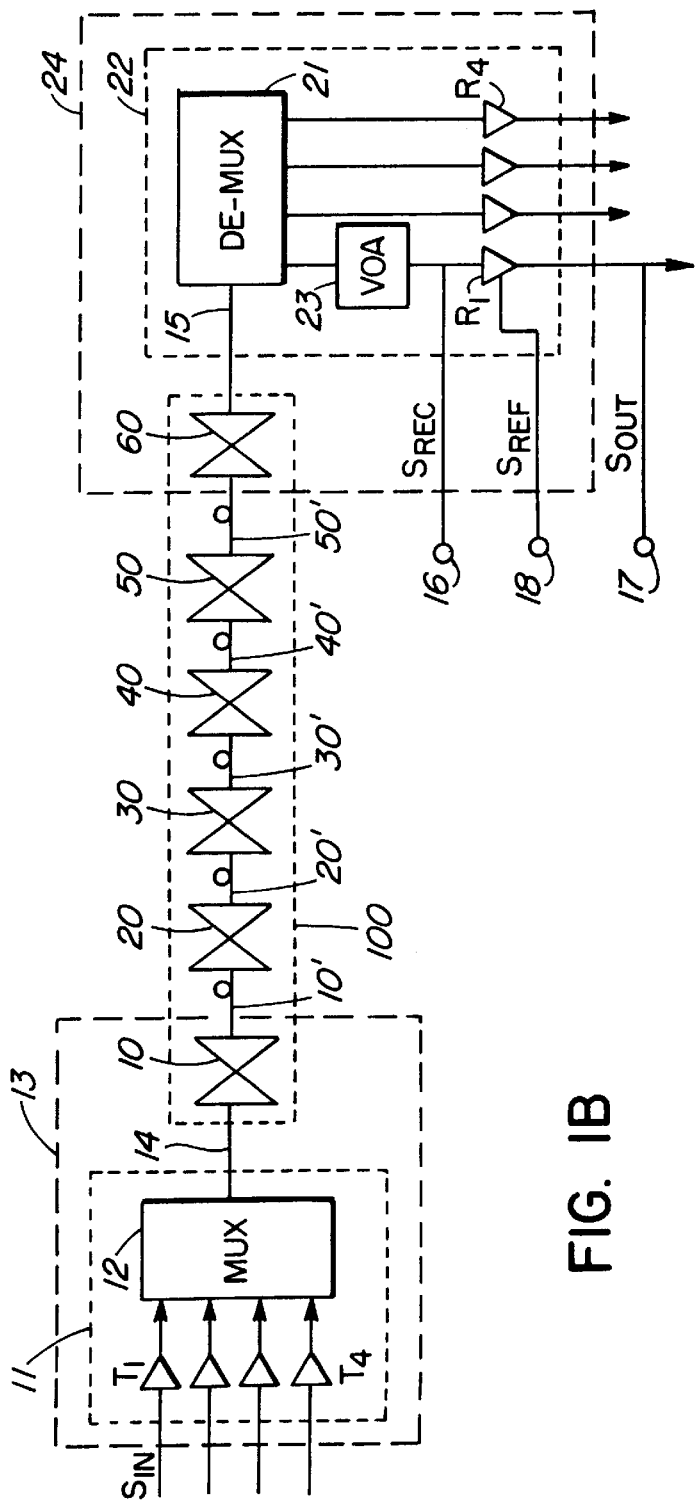
FIG. 1B is a schematic of a multi-span multi-channel optical transmission system showing the points of measurement for measuring BER, P and OSNR.

FIG. 1B illustrates a block diagram of a typical 5-span, 8-wavelength bidirectional transmission system (i=8) used as an example for explaining the measurement technique according to the invention. Only the forward channels are illustrated on FIG. 1B for simplification. It is to be understood that the invention is not restricted to systems as that illustrated herein, but also applies to systems having more or less spans and channels, and also to unidirectional systems.

Each transmitter $T_i$ 11 at the transmitter site 13, communicates with a corresponding receiver $R_i$ 22 at the receiver site 24, over a channel characterized by the wavelength of the optical carrier ($\lambda_i$).

The four signals, each corresponding to a forward channel $\lambda_i$, are mixed by a multiplexer 12 prior to insertion on fiber 14. The multi-channel signal is amplified by a post-amplifier 10 and then is transmitted over line amplifiers 20, 30, 40, and 50, series connected by spans 10', 20', 30', 40', and 50', respectively. At site 24, the multi-channel signal is first amplified in preamplifier 60, and separated in individual channel signals by a demultiplexer 21, according to their wavelength $\lambda_i$. The forward signals for each channel are then applied to a respective receiver $R_i$ for decoding. The channels in the reverse direction comprise transmitters at site 24 and receivers at site 13, all connected over the same bidirectional transmission link.

A variable optical amplifier VOA 23 is provided at the input of receiver $R_1$ for controlling the level of the received power ($P_O$), as needed for the measurements according to the invention.

The term 'transmission link' or 'link' is used in this specification for designating the amplifiers and fiber spans enclosed in the dotted-line box 100. The term 'transmission path' is used in this specification for designating the equipment and fiber spans between a transmitter $T_i$ and a corresponding receiver $R_i$, including the transmitter and the receiver. The term 'transmitter-receiver pair' is used to designate a transmitter $T_i$ and a receiver $R_i$, which are linked in a particular application over channel $\lambda_i$, but it does not include the equipment and fiber spans connecting $T_i$ to $R_i$.

Operating point OP for channel $\lambda_1$ is defined by $P_O$ and $OSNR_O$ values measured at the input of the receiver $R_1$, shown at 16. OP is set by adjusting the power of the signal $P_O$ for a given $OSNR_O$.

The term 'input of receiver $R_i$' is used for example to designate measurement point 17 shown on FIG. 1 at the input of receiver $R_1$ for channel $\lambda_1$. The term 'output point of a channel $\lambda_i$' is used to designate the output of receiver $R_i$ such as is point 17 on FIG. 1 for channel $\lambda_1$.

The BER measured for the current $OP_1$ of the channel $\lambda_1$ ($BER_M$) comprises information on both noise and distortion of the transmission path. The back-to-back BER ($BER_{BB}$) measured in $OP_1$ of channel $\lambda_1$ ($BER_{BB}$) comprises information on the distortion introduced by the $T_1$–$R_1$ pair, and the distortion-free BER ($BER_{DF}$) accounts for noise only errors for the entire path. The $BER_M$, $BER_{BB}$ values are used for determining the corresponding $Q_M$, $Q_{BB}$ values using formula (2) and the distortion-free Q ($Q_{DF}$) is either computed in software or determined from the corresponding $BER_{DF}$ value. A comparison between $Q_M$ and $Q_{BB}$ gives the distortion introduced by link 100. A comparison between $Q_{BB}$ and $Q_{DF}$ gives the distortion introduced by the transmitter-receiver pair, and a comparison between $Q_M$ and $Q_{DF}$ gives the distortion for the entire path.

Figure 2A:
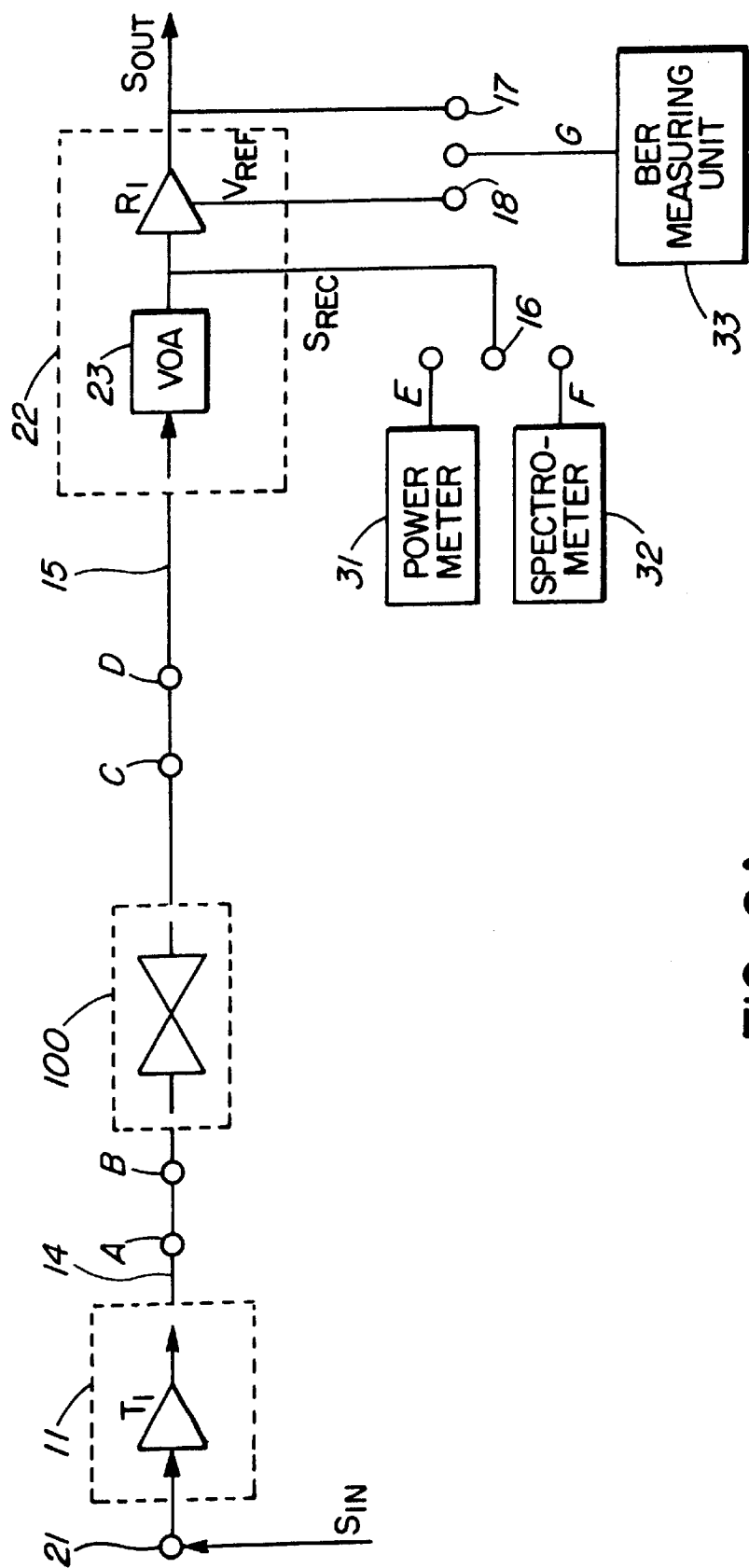
FIG. 2A is a schematic of the measurement technique for determining the value of a Q measured ($Q_M$) in the operating point of a channel of the system of FIG. 1B.

The signal level measurement technique according to this invention comprises the following steps:

Step 1. The parameters $P_O$ and $OSNR_O$ of the operating point $OP_1$ of channel $\lambda_1$ are measured in point 16. $P_O$ and $OSNR_O$ are measured in the known manner, using power meter 31 and a spectrometer 32 respectively, as shown in FIG. 2A, with link 100 connected between points A and D.

Step 2. $Q_{DF}$ for the respective transmitter-receiver pair $T_i,R_i$ (i=1 in the example discussed herein) is determined for the operating point $OP_1$. This parameter can be used subsequently for determining the distortion in any point along the transmission link connecting $T_i$ to $R_i$. $Q_{DF}$ can be either computed or measured.

$Q_{DF}$ can be computed using a software model for receiver $R_i$, and this Q is referred to herein as the 'computed $Q_{DF}$'. Design of such a model requires exact knowledge of the receiver parameters such as noise bandwidth, and thermal noise. Given a model for the receiver, $P_O$ and $OSNR_O$ entirely determine the performance of the system in the absence of distortion.

Figure 2B:
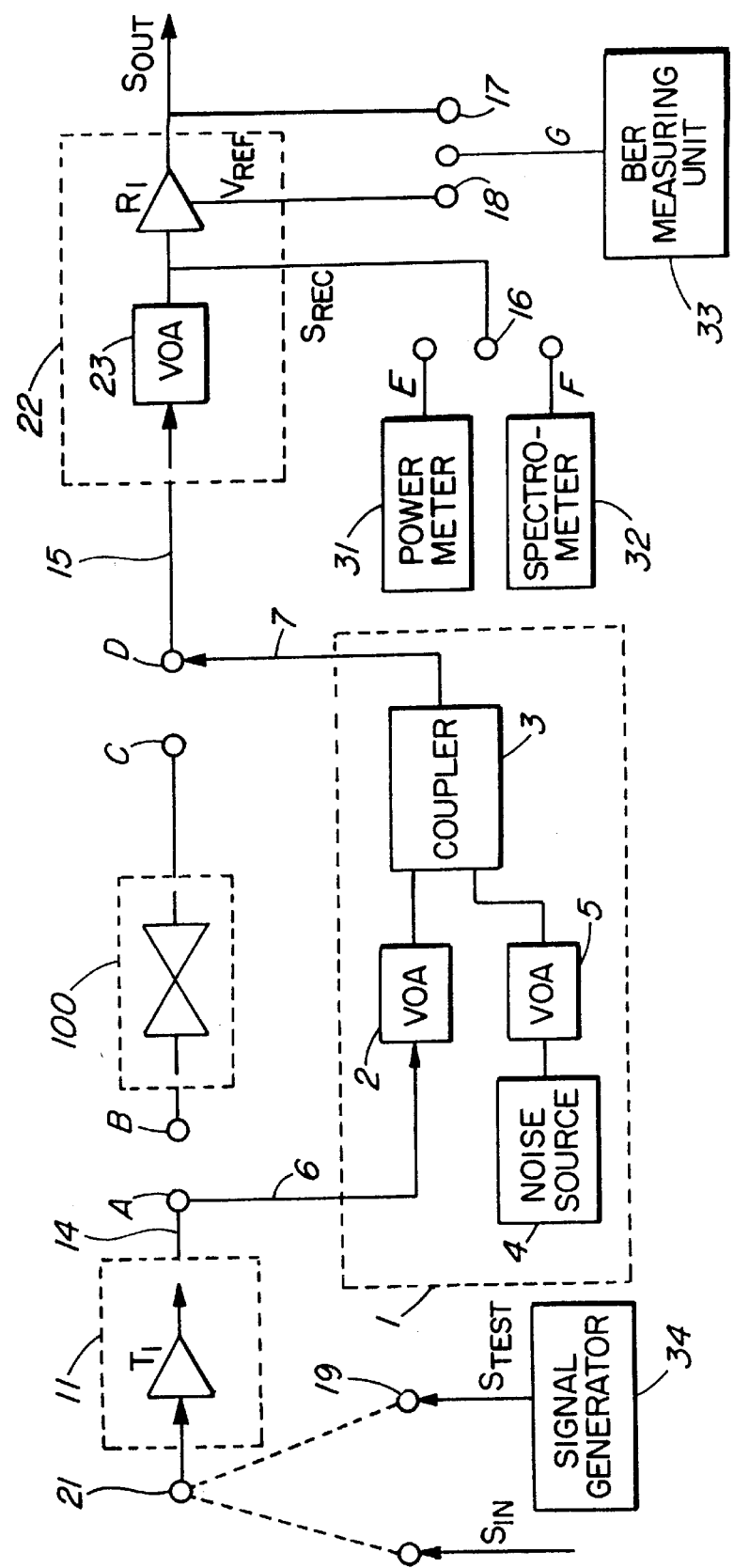
FIG. 2B is a schematic of the measurement technique for estimating a distortion free Q ($Q_{DF}$) and a back-to-back Q ($Q_{BB}$) for the system of FIG. 1B.

$Q_{DF}$ can also be measured, using distortion measurement unit (DMU) 1 connected as illustrated in FIG. 2B. To this end, input 6 of VOA 2 is connected to point A at the output of transmitter unit 11, channel $\lambda_1$, and output 7 of coupler 3 is connected to point D at the input of receiver 22, replacing link 100. By replacing link 100 with DMU 1, the distortion introduced by link 100 is eliminated from the measurement, the only errors introduced in the measurement are due to the noise.

Wavelength $\lambda_1$ is modulated with a test signal comprising a data stream of 'long 1s' and 'long 0s', received from a signal generator 34, for avoiding distortions. To this end, a test signal $S_{TEST}$ output by signal generator 34 is applied to the modulating input 21 of transmitter $T_1$, rather than the information signal $S_{IN}$. VOA 23 adjusts the power of the test signal to obtain $P_O$ in point 16. The BER is measured in point 17 as a function of the reference voltage $V_{Ref}$ applied to receiver $R_1$ on terminal 18. The BER, power level, and OSNR measurements are effected in the known way using a BER measuring unit 33, power meter 31, and spectrometer 32. Output E of power meter 31 and output F of spectrometer 32 are connected to point 16 for the respective measurement. Output G of the BER measuring unit 33 is connected to point 17, while $V_{Ref}$ is controlled on input 18 in any suitable way. A Q value is calculated with formula (2) for each BER measurement, and a Q-V diagram (which is a modified BERV diagram) is plotted for a satisfactory number of points. $Q_{DF}$ is then determined graphically on the Q-V diagram, at the point of intersection between the prolonged flanks of the Q-V diagram.

Either the computed or the measured $Q_{DF}$ can be used for determining distortion.

Step 3. The BERM for channel 1 of $\lambda_1$ in this example, is measured on output 17 with BER measuring unit 33 under normal conditions of operation of the system, with traffic on all channels. This measurement is performed in point 17 on the configuration of FIG. 2A. $BER_M$ comprises errors due to noise and errors due to the distortion cumulated along the entire transmission path. $BER_M$ is used for calculating $Q_M$ applying formula (2).

Step 4. As indicated above, $BER_{BB}$ comprises error information on the errors (noise and distortion) introduced by the $T_1$–$R_1$ pair and the noise introduced by link 100. This $BER_{BB}$ is measured using again DMU 1 connected as shown in FIG. 2B. The information signal $S_{IN}$ is applied on the modulating input 21 of transmitter $T_i$, rather than the test signal from generator 34. The signal on channel $\lambda_1$, which is now the signal transported by this channel under normal conditions of operation, is re-routed to the input of VOA 2 so that it travels from transmitter $T_1$ to receiver $R_1$ on an alternate distortion-free path. Traffic on all other channels remains unaffected. The power of the signal is adjusted using VOAs 2 and 23 to obtain $P_O$ on power meter 31 in measuring point 16, while the noise level is adjusted using VOA 5 to obtain $OSNR_O$ on spectrometer 31 in point 16. When in the operating point, the value of $BER_{BB}$ is measured on output 17 with BER measuring unit 33.

As such, the noise level in the information signal at the input of the receiver is pulled up to the level of noise given by the entire path under normal operating conditions, i.e. with link 100 connected between points A and D. However, the distortion introduced by link 100 is not accounted for in this measurement, as link 100 is disconnected.

$Q_{BB}$ is then calculated using formula (2), and it contains information introduced by the distortion of the $T_1$–$R_1$ pair.

Step 5. The difference between $Q_M$ and $Q_{BB}$ is representative of the distortion introduced by link 100, and is denoted in this specification by $D_L$. This difference is calculated using formula:

$$D_L = 10^{log10(Q_M/Q_{BB})} \quad (3)$$

Step 6. The comparison between $Q_{DF}$ and $Q_{BB}$ gives the distortion introduced by the $T_1$–$R_1$ pair, and is denoted by $D_{TR}$.

$$D_{TR} = 10^{log10(Q_{BB}Q_{DF})} \quad (4)$$

Step 7. The total distortion over $T_i$–$R_i$ path is the sum of $D_{TR}$ and $D_{BB}$ and is denoted herein with $D_P$.

$$D_P = D_{TR} + D_L \quad (5)$$

$D_P$ may also be calculated by comparing $Q_M$ and $Q_{DF}$ according to formula:

$$D_P = 10^{log10(Q_M/Q_{DF})} \quad (6)$$

Experiments were conducted on a five span OC-192 multi-wavelength configuration as shown in FIG. 1B, having a loss of 23 dB/span. $BER_{DF}$ was measured with the embodiment of FIG. 2B using the 'long 1s' and 'long 0s' method and a $Q_{DF}$ of 26 was calculated. The computed value of $Q_{DF}$ using the receiver model, is less than 26. To obtain the same $Q_{DF}$, the noise bandwidth of receiver $R_1$ was adjusted to 3.6 GHz, which is lower than the bandwidth of the expected average electric noise. This is consistent with the large value measured for $D_{BB}$. The results are illustrated in Table 1.

TABLE 1

| Case | System OC-192 | $OSNR_O$ (dB) | $P_O$ (dBm) | $BER_M$/ $Q_M$ | $BER_{BB}$/ $Q_{BB}$ | $Q_{DF}$ | $D_L$ (dBQ) | $D_{TR}$ (dBQ) | $D_P$ (dBQ) |
|---|---|---|---|---|---|---|---|---|---|
| 1. | 8λ | 23.5 | −11.5 | /10.2 | /6.2 | /26 | −2.16 | 6.22 | 4.05 |
| 2. | 4λ | 28.2 | −30.72 | $10^{-9}$/6 | $3 \times 10^{-7}$/5 | /7.94 | −0.79 | 2.01 | 1.22 |

Figure 3:
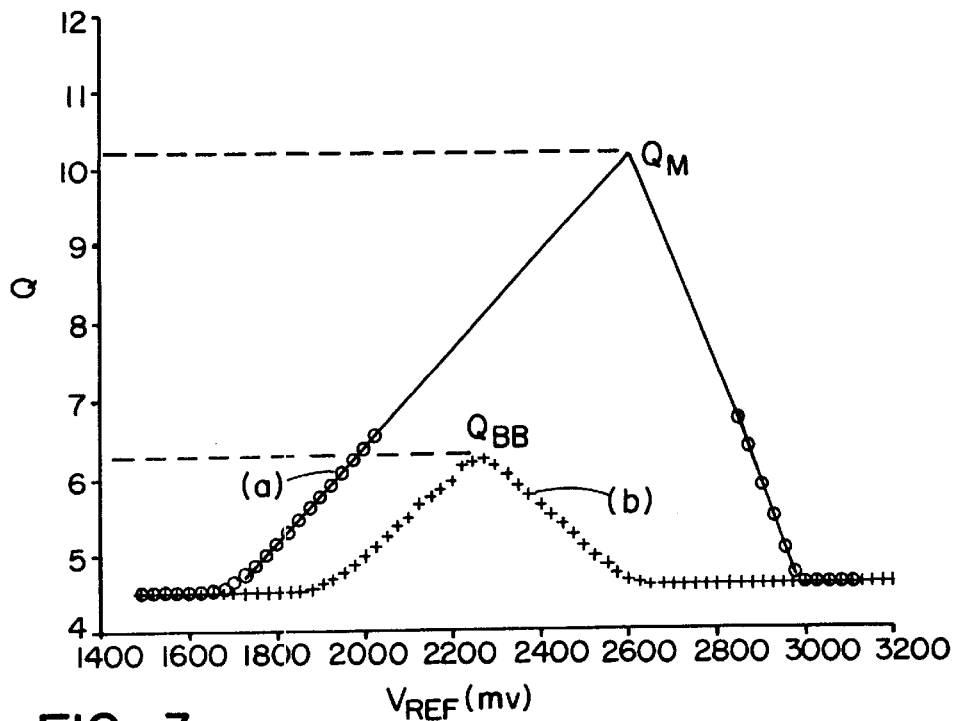
FIG. 3 is a Q-V diagram illustrating $Q_M$ and $Q_{BB}$ as shown in FIGS. 2A and 2B.

FIG. 3 is a Q-$V_{Ref}$ diagram plotted for case 1 of Table 1, showing the experimental results in an OP characterized by an $OSNR_O$ of 23.5 dB and a receiver power $P_O$ of −11.5 dBm. Q was calculated according to formula (2) for each value of BER. Diagram 'a' shows $Q_M$, while diagram 'b' illustrates $Q_{BB}$, for various threshold voltage levels $V_{Ref}$. The value of $Q_M$ was estimated by extrapolation, by prolonging the flanks of the Gaussian graph obtained with the measurements effected over a reasonable period of time, namely 5–10 minutes for all points. $D_L$ is negative, so that the path distortion is less than the pair distortion by 2.16 dBQ.

As indicated above, distortion penalty may also be determined using waterfall diagrams. The measurements noted as case 2 were performed for a 4λ hybrid OC-48/192 five span dispersion shifted fiber (DSF) system configuration. The loss for this configuration is 24 dB/span. A $Q_{DF}$ of 7.94 was calculated, rather than measured, using a receiver model.

The waterfall diagrams were prepared for an OSNR of 28.2 dB measured over a 0.1 nm bandwidth, for channel $\lambda_1$=1528 nm, by measuring the values of BER for various values of the power at the input of receiver $R_1$.

Figure 4:
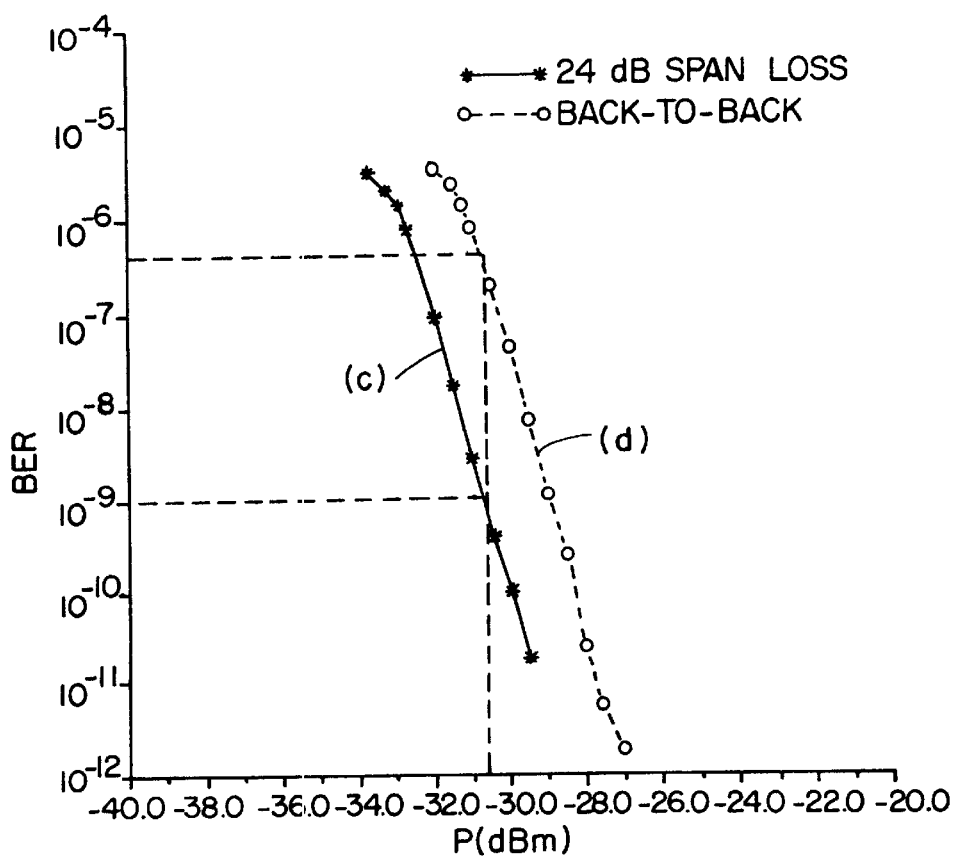
FIG. 4 are waterfall diagrams showing $BER_M$ and $BER_{BB}$ measured as shown in FIGS. 2A and 2B.
Figure 5:
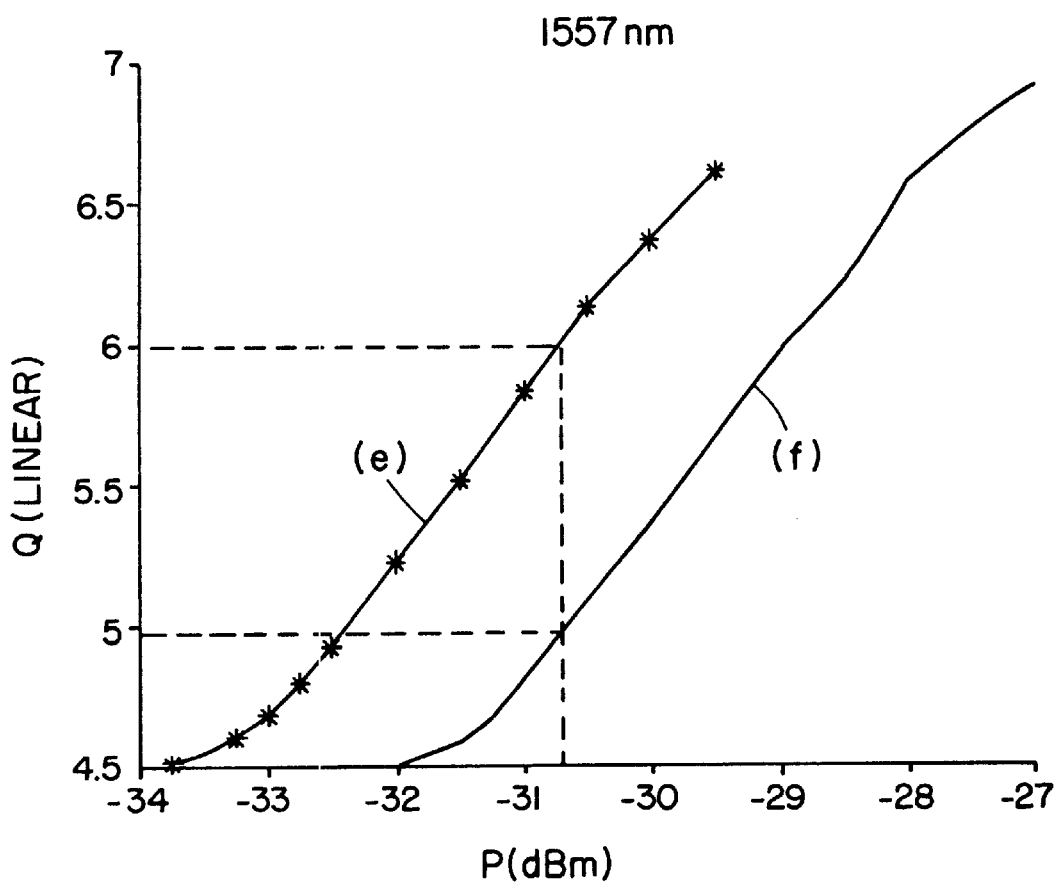
FIG. 5 shows $Q_M$ and $Q_{BB}$ extracted from the waterfall diagrams of FIG. 4.

Diagram (g) on FIG. 4 shows the waterfall diagram for $BER_M$ while diagram (h) shows the waterfall diagram for $BER_{BB}$. FIG. 5 illustrates the corresponding Q values calculated from the waterfall diagrams of FIG. 4 using formula (2). As such, diagram (i) illustrates $Q_M$, and diagram (j) shows $Q_{BB}$.

For a BER of $10^{-9}$, FIG. 4 shows a signal power of −30.72 dBm measured in point 16 on FIG. 2B. The value of BER=$10^{-9}$ corresponds to a $Q_M$ of 6, when calculated with formula (2), or directly read on diagram (i) of FIG. 5. $BER_{BB}$ in the same operating point is $3 \times 10^{-7}$ which corresponds to a $Q_{BB}=5$ on FIG. 7.

$D_{TR}$ is calculated as the difference between the $Q_{DF}$ and $Q_{BB}$ with formula (4), which gives $D_{TR}=10^{log_{10}(7.94/5)}=2.01$ dBQ.

The path distortion penalty is calculated with formula (6) and it gives $D_P=10^{log_{10}(7.94/6)}=1.22$ dBQ. $D_P$ can also be calculated with formula (5) and it gives $D_{BB}-D_P=2.01-0.79=1.22$ dBQ.

While the invention has been described with reference to particular example embodiments, further modifications and improvements which will occur to those skilled in the art, may be made within the purview of the appended claims, without departing from the scope of the invention in its broader aspect.

I claim:

1. A method for measuring the distortion penalty imposed on an information signal travelling on a transmission path including a transmitter, a receiver, and a transmission link connecting said transmitter and said receiver, comprising the steps of:

(a) determining an operating point (OP) for said transmission path;

(b) measuring a first parameter including information on errors in said information signal cumulated along said path;

(c) measuring a second parameter including information on errors in said information signal due to the noise cumulated along said path;

(d) calculating a path distortion penalty ($D_P$) value by comparing said first parameter with said second parameter.

2. A method as claimed in claim 1, wherein said step (a) comprises:

measuring the power ($P_O$) of said information signal at the input of said receiver; and measuring the optical signal-to-noise ratio ($OSNR_O$) of said information signal at the input of said receiver.

3. A method as claimed in claim 2, wherein said step (c) comprises:

replacing said information signal with a test signal selected to present negligible distortions;

by-passing said transmission link by connecting the output of said transmitter to the input of said receiver;

adjusting said test signal to replicate said OP; and determining said second parameter for said test signal in said OP.

4. A method as claimed in claim 3, wherein said step of adjusting comprises:

adjusting the power of said test signal to measure $P_O$ at the input of said receiver; and adding noise to said test signal to measure $OSNR_O$ at the input of said receiver.

5. A method as claimed in claim 1, wherein said step (c) comprises:

adopting a software model for said receiver; and computing said second parameter in said OP, using said software model.

6. A method as claimed in claim 3, wherein said test signal comprises a data stream of 'long 1s' and 'long 0s'.

7. A method as claimed in claim 1, further comprising the step of (e) measuring a third parameter including information on errors in said information signal due to the noise cumulated along said path and also due to distortion introduced by said transmitter and receiver.

8. A method as claimed in claim 7, wherein said step (e) comprises:

by-passing said transmission link by connecting the output of said transmitter to the input of said receiver;

adjusting said information signal to replicate said OP; and determining said third parameter for said information signal in said OP.

9. A method as claimed in claim 8, wherein said step of adjusting comprises:

adjusting the power of said information signal to measure $P_O$ at the input of said receiver; and adding noise to said information signal to measure $OSNR_O$ at the input of said receiver.

10. A method as claimed in claim 1, wherein said first parameter is a Q factor ($Q_M$) estimated at the output of said receiver.

11. A method as claimed in claim 10, wherein said second parameter is a distortion-free Q factor ($Q_{DF}$) estimated at the output of said receiver.

12. A method as claimed in claim 11, wherein said third parameter is a back-to-back Q factor ($Q_{BB}$) estimated at the output of said receiver.

13. A method as claimed in claim 12, wherein any of said steps (b), (c) and (e) of measuring said first, second and third parameter, respectively, comprises:

applying a plurality of reference voltage values to said receiver and plotting a bit error rate-reference voltage (BERV) diagram;

estimating a most probable value of the BER on said BERV diagram; and calculating a corresponding Q factor.

14. A method as claimed in claim 13, wherein said step of estimating comprises:

linearly extrapolating the flanks of said BERV diagram to obtain a point of intersection; and determining the BER value corresponding to said point of intersection as said most probable value of the BER.

15. A method as claimed in claim 13, wherein said respective Q factor is calculated by substituting $BER_M$ into the formula:

$$Q^2 = 4.452 \log\left(\frac{0.1235}{BER}\right).$$

16. A method as claimed in claim 11, wherein said $D_P$ value is calculated in said step (d) using the formula:

$$D_P = 10^{log_{10}(Q_M/Q_{DF})}.$$

17. A method as claimed in claim 12, wherein any of said steps (b), (c) and (e) of measuring said first, second and third parameters, respectively, comprises:

applying a plurality of power values at the input of said receiver and plotting a BER-power diagram, for an $OSNR_O$ value corresponding to said OP;

estimating a respective BER value corresponding to a value $P_O$ corresponding to said OP; and calculating a corresponding Q factor for said operating point OP.

18. A method as claimed in claim 17, wherein said step of estimating comprises:

linearly extrapolating the flanks of said waterfall diagram; and determining the BER value corresponding to said value $P_O$.

19. A method as claimed in claim 7, further comprising the step of comparing said second parameter with said third parameter for determining a pair distortion penalty ($D_{TR}$) accounting for the distortion introduced by said transmitter and said receiver only.

20. A method as claimed in claim 19, further comprising the steps of:

determining said $D_{TR}$ for a plurality of transmitter-receiver pairs;

comparing each said $D_{TR}$ with a provisioned $D_{Prov}$; and selecting for said transmission path a transmitter-receiver pair having said $D_{TR}$ less than said $D_{Prov}$.

21. A method as claimed in claim 19, further comprising the step of comparing said first parameter with said third parameter for determining a link distortion penalty ($D_L$) accounting for the distortion introduced by all network elements and optical fiber spans connected between said transmitter and said receiver.

22. A method as claimed in claim 21, further comprising the step of adding said $D_L$ and said $D_{TR}$ to determine said $D_P$.

* * * * *